(12) United States Patent
Korcz et al.

(10) Patent No.: US 9,371,962 B2
(45) Date of Patent: Jun. 21, 2016

(54) SWIVEL COVER ASSEMBLY

(71) Applicants: Krzysztof W. Korcz, Granger, IN (US); Mahran H. Ayrton, South Bend, IN (US)

(72) Inventors: Krzysztof W. Korcz, Granger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 216 days.

(21) Appl. No.: 13/648,301

(22) Filed: Oct. 10, 2012

(65) Prior Publication Data
US 2014/0097315 A1  Apr. 10, 2014

(51) Int. Cl.
| | | |
|---|---|---|
| B42F 13/00 | (2006.01) |
| H02G 3/20 | (2006.01) |
| F16M 13/02 | (2006.01) |
| F21V 21/03 | (2006.01) |
| F21V 21/26 | (2006.01) |
| A47H 1/10 | (2006.01) |
| H05K 5/02 | (2006.01) |
| F21S 8/08 | (2006.01) |
| F21V 19/02 | (2006.01) |
| F21S 8/00 | (2006.01) |
| F16C 11/00 | (2006.01) |
| E05D 5/02 | (2006.01) |
| E05D 7/10 | (2006.01) |
| E05D 7/12 | (2006.01) |
| E05D 1/06 | (2006.01) |
| H02G 3/14 | (2006.01) |
| H02G 3/06 | (2006.01) |
| H02G 3/08 | (2006.01) |

(52) U.S. Cl.
CPC ............. *F16M 13/027* (2013.01); *F21V 21/03* (2013.01); *F21V 21/26* (2013.01); *H02G 3/20* (2013.01); *H02G 3/0616* (2013.01); *H02G 3/083* (2013.01); *H02G 3/14* (2013.01)

(58) Field of Classification Search
CPC .............. E05D 1/00; E05D 1/04; E05D 1/06; Y10T 16/53613; Y10T 16/536; Y10T 16/557; Y10T 16/535; Y10T 16/53607
USPC .......... 248/345, 342, 343, 344; 362/418, 421, 362/427; 403/123, 141, 142, 143, 114, 83, 403/119; 174/480, 491, 503, 60, 66, 61, 58, 174/54; 292/1, 95, DIG. 53, DIG. 54, 336.3, 292/256; 16/252, 254, 27, 266, 268, 270
See application file for complete search history.

(56) References Cited

U.S. PATENT DOCUMENTS

| | | | | |
|---|---|---|---|---|
| 2,396,837 | A * | 3/1946 | Ellinwood | 174/40 CC |
| 2,832,658 | A * | 4/1958 | Bullock | 312/194 |
| 2,943,137 | A * | 6/1960 | Van Wyngarden | 174/61 |
| 3,236,408 | A * | 2/1966 | McFadden et al. | 220/836 |
| 3,705,302 | A * | 12/1972 | Judge et al. | 362/222 |
| 4,037,098 | A * | 7/1977 | Kowalski | 362/418 |
| 4,044,908 | A | 8/1977 | Dauberger | |

(Continued)

*Primary Examiner* — Syed A Islam
*Assistant Examiner* — Taylor Morris
(74) *Attorney, Agent, or Firm* — Dickinson Wright PLLC (57) ABSTRACT

A swivel cover assembly includes a mounting plate with an opening and a door closing the opening for supporting a swivel hanger. The mounting plate forms a socket for suspending the swivel hanger. The door is hinged to the mounting plate to pivot downwardly from the mounting plate about an axis parallel to the plane of the mounting plate. A hinge member is integrally formed with the mounting plate and door. A fastening member latches the door in the closed position. The fastener can be a screw or a bendable tab that is manually bent to hold the door closed.

27 Claims, 6 Drawing Sheets

(56) References Cited

U.S. PATENT DOCUMENTS

| | | | |
|---|---|---|---|
| 4,358,871 A * | 11/1982 | Takai | 16/262 |
| 4,426,126 A * | 1/1984 | De Vos et al. | 439/572 |
| 4,448,388 A * | 5/1984 | Dennis et al. | 248/663 |
| 6,646,202 B2 * | 11/2003 | Garvin et al. | 174/66 |
| 6,649,837 B2 | 11/2003 | Garvin | |
| 6,722,621 B2 | 4/2004 | Johnson | |
| 6,930,250 B1 * | 8/2005 | Drane | 174/58 |
| 2003/0146010 A1 | 8/2003 | Garvin et al. | |
| 2003/0146013 A1 | 8/2003 | Garvin | |

\* cited by examiner

SWIVEL COVER ASSEMBLY

FIELD OF THE INVENTION

The present invention is directed to a swivel connector and to a swivel cover assembly for suspending an electrical device such as a luminaire, lighting fixture or ceiling fan. The invention is particularly directed to a swivel cover assembly having a pivotally mounted door to enable easy assembly of the swivel connector to the base.

BACKGROUND OF THE INVENTION

Swivel connectors are commonly used for mounting and suspending electrical devices. Swivel connector are often used for mounting ceiling fans to an electrical box so that the ceiling fan is suspended below the electrical box. The swivel mount allows for some movement between the ceiling fan and the electrical box caused by the rotation and vibration of the fan.

Various mounting fixtures are known in the art for supporting electrical devices. One example is disclosed in U.S. Pat. Nos. 6,646,202 and 6,649,837 to Garvin et al. The hanger assemblies include a stationary cover assembly and a movable cover section that mates with the stationary cover section to a seat for a swivel connector. A rigid strap is pivotally connected to the stationary cover section and fixed to the movable cover section. The movable section pivots outward away from the side of the fixed section.

U.S. Pat. No. 6,930,250 to Drane discloses a two-piece swivel hanger assembly having a mounting plate and a swivel element. An access door is slidably connected to the mounting plate. The access door is sized to cover the access door and is slidable in a radial direction toward the opening in the closed position.

While the prior devices have been suitable for their intended purpose, there is a continuing need in the industry for improved devices for supporting an electrical device.

SUMMARY OF THE INVENTION

The present invention is directed to a swivel cover hanger assembly for an electrical device. The invention is particularly suitable for suspending an electrical device, such as a luminaire, lighting fixture or a ceiling fan, from an electrical box. The assembly can be mounted to an inclined ceiling or support surface with the swivel connector hanging in a vertical orientation.

Accordingly, one object of the invention is to provide swivel cover assembly for coupling to an electrical box that is easy to assemble with a minimum of parts.

Another feature of the invention is to provide a swivel cover assembly having a mounting plate with an opening for a swivel connector and cover door coupled to the mounting plate where the cover pivots downward from the mounting plate to allow easy access to the opening for the swivel connector. The swivel connector and the electrical device can be suspended in a vertical orientation when the electrical box and the base of the assembly are mounted at an incline.

The features of the invention are also provided by an assembly having a mounting plate and a cover door where the cover door pivots about an axis parallel to the plane of the mounting plate. The door is able to pivot open by gravity.

The swivel cover assembly of the invention has a cover door that is hinged to a mounting plate where the cover door pivots in a direction without interference from the ceiling or electrical box.

Another feature of the invention is to provide a swivel cover assembly where the cover door pivots downwardly by gravity to the open position when the latch mechanism is released. The cover door is able to swing away from the mounting plate to allow access to the electrical box without interference from the ceiling panel.

A further feature of the invention is to provide a swivel cover assembly where the cover door is hinged to the mounting plate by hinge members that are integrally formed with the mounting plate and cover door.

These and other aspects of the invention are basically attained by providing a swivel cover assembly comprising a mounting plate adapted for coupling to an electrical box. The mounting plate has a planar base with an opening. The opening has a first portion defined by a flange extending outwardly from the mounting plate and forming a socket adapted for supporting a swivel hanger, and a second portion with a dimension to receive the swivel hanger. The mounting plate has a first hinge member. A door has a first end with a second hinge member pivotally coupled to the first hinge member to pivot the door about an axis substantially parallel to the plane of the base. The first end further includes a coupling tab positioned to extend through the opening in the base of the mounting plate and engages a top surface of the base in a closed position. The door has a second end with a fastener for coupling with the base of the mounting plate and retaining the door in a closed position.

The various feature of the invention are also attained by providing a swivel cover assembly, comprising a mounting plate adapted for being coupled to an electrical box. The mounting plate has an opening with a first portion having a downwardly extending flange around the first portion of the opening to form a socket, and a second portion. A swivel hanger has an end adapted for mating with the socket and has a dimension to pass through the second portion of the opening. A door with a planar base has a first end hinged to the mounting plate to pivot about an axis parallel to a plane of the mounting plate whereby the door pivots in a downward direction away from the mounting plate, and a coupling member for coupling the mounting plate and the door in a closed position to close the first portion and second portion of the opening.

The features of the invention are further attained by providing a swivel assembly comprising an electrical box having a downwardly facing open end. A mounting plate is coupled to the open end of the electrical box. The mounting plate has a downwardly extending flange defining a first portion of an opening and a socket. The opening in the mounting plate further has a second portion. The mounting plate has a tab forming a hinge barrel with a center axis extending substantially parallel to a plane of the mounting plate. A swivel hanger has an end for mating with the socket and has a dimension to pass through the second portion of the opening in the mounting plate. A door has a first end coupled to the hinge barrel to pivot the door downwardly about an axis parallel to the plane of the mounting plate. A fastener couples to the mounting plate and retains the door in a closed position.

These and other objects and advantages of the invention will become apparent from the following detailed description of the invention which, taken in conjunction with the annexed drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to a swivel cover assembly for supporting a swivel hanger and an electrical device. The invention is particularly directed to a swivel cover assembly having a door pivotally connected to a mounting plate forming a base where the door pivots downwardly about a fixed pivot point. The electrical device that can be supported by the assembly can be a luminaire, lighting fixture, ceiling fan, or other device.

Referring to the drawings, the swivel cover assembly 10 is mounted to a standard electrical box 12. The electrical box 12 is mounted to a ceiling or other support structure such as a ceiling joist or bar hanger adapted for supporting the weight of an electrical device such as a luminaire or ceiling fan. The swivel cover assembly includes a mounting plate 14 with a door 16 and a swivel hanger 18. In the embodiments shown, the swivel hanger 18 is connected to a conduit 20 which is coupled to the electrical device.

The electrical box 12 is a standard ceiling mounted electrical box capable of supporting the weight of an electrical device such as a luminaire. In the embodiment shown, the electrical box 12 has a square configuration with standard knock-outs in each of the side walls and bottom wall. The open end of the electrical box includes mounting tabs with a threaded hole for receiving mounting screws 22 for attaching the swivel cover assembly 10 to the electrical box 12. Electrical box 12 can be mounted to a horizontal support such as that shown in FIG. 25 or on an inclined support such as a vaulted ceiling.

Mounting plate 14 has a planar base 24 with a dimension to mate with the electrical box 12. The base 24 includes a slot 26 and a keyhole-shaped slot 28 for receiving the mounting screws 22. The base 24 preferably has a shape corresponding to the shape of the electrical box 12. In the embodiment shown, the base has a square configuration complementing the shape of the square box 12. In other embodiments, the electrical box can be round and the base 24 can be round and sized to complement the round box. Mounting plate 14 includes a frustoconical shaped flange forming a collar 30 extending outwardly from the plane of the base 24 and defining a central opening 32. Collar 30 has a curved concave inner face 34 forming a socket for the swivel hanger 18 and a convex outer surface.

In the embodiment shown, collar 30 extends partially around opening 32 to define an arc with an open area 38 formed between the ends 39 of the collar 30. The collar 30 has an arcuate shape extending around the central opening with a length sufficient to support the swivel connector. The open area 38 has a dimension sufficient to allow the swivel hanger 18 to pass easily through the opening and be received in the socket defined by the collar 30. Opening 32 has a first portion defined by the collar 30 and a second portion 40 formed in the base 24. The second portion 40 of the opening extends outwardly from the collar 30 toward an outer edge 42 of base 24 so that the opening is formed completely within the perimeter of the mounting plate 14.

Figure 4:
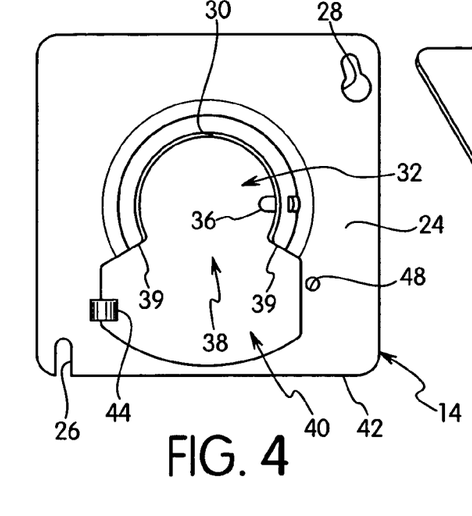
FIG. 4 is a top view of the mounting plate of the swivel cover assembly.
Figure 5:
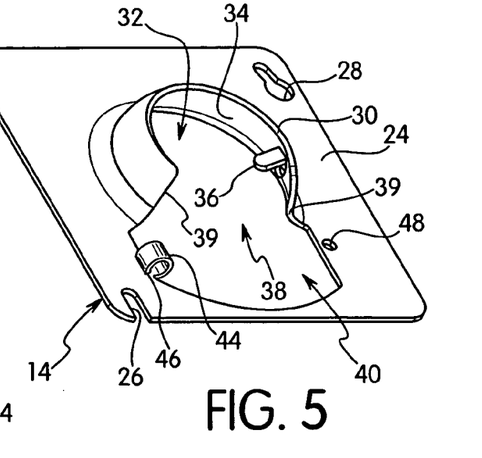
FIG. 5 is a perspective view of the mounting plate of FIG. 4.
Figure 6:
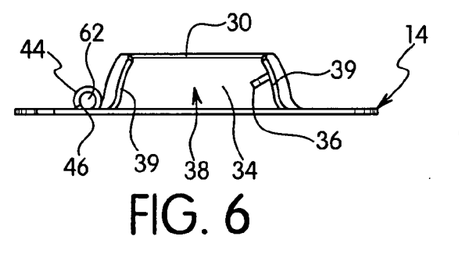
FIG. 6 is a side view of the mounting plate of FIG. 4.

A tab is formed at one end of the second portion 40 of the opening and bent to form a cylinder which functions as a hinge barrel 44 as shown in FIGS. 4 and 5. As shown in the drawings, the hinge barrel is formed by bending the tab outwardly away from the second portion 40 of the opening so that the distal end 46 of the tab is closely spaced to the outer face of the base 24. Preferably the hinge barrel 44 is integrally formed with the base 24 as a one-piece unit.

An aperture 48 is provided at the opposite end of the opening 40 to define a screw hole for the door 16. Door 16 has a shape and dimension to overlie the second portion 40 of the opening 32 for closing the opening and capturing the swivel hanger 18.

Figure 3:
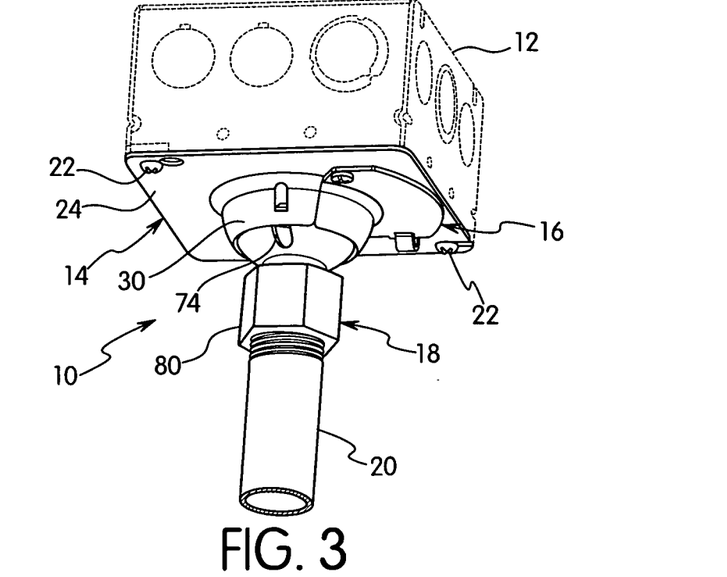
FIG. 3 is a perspective view showing the assembled swivel cover assembly with the door in the closed position.
Figure 7:
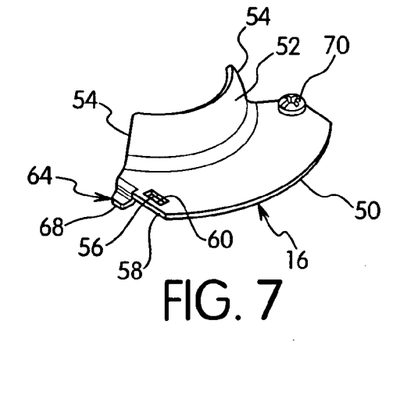
FIG. 7 is a perspective view of the door of the swivel cover assembly.
Figure 8:
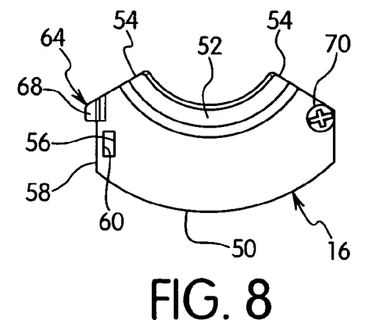
FIG. 8 is a top view of the door of FIG. 7.
Figure 9:
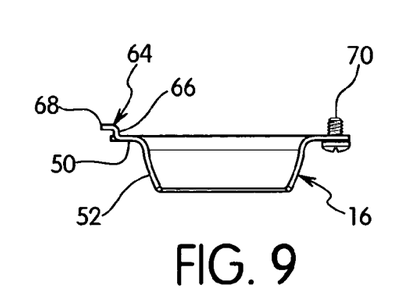
FIG. 9 is a side view of the door of FIG. 7.
Figure 10:
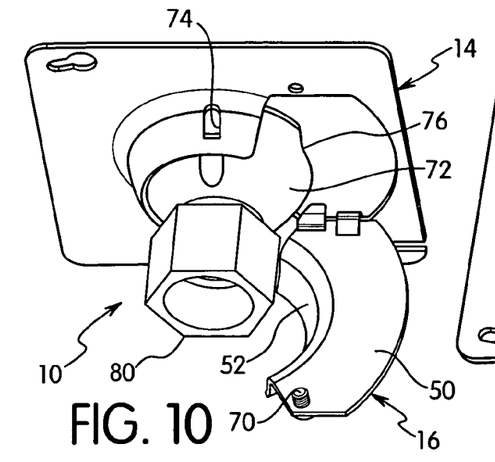
FIG. 10 is a perspective view of the swivel cover assembly showing the door in the open position.
Figure 14:
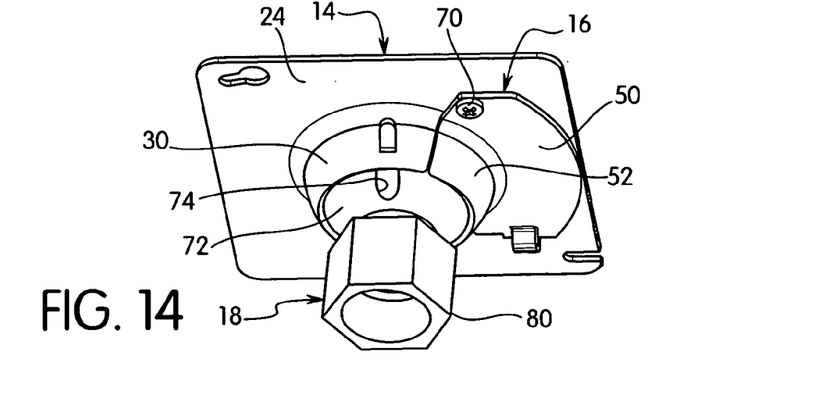
FIG. 14 is a bottom perspective view showing the door in the closed position.

Referring to FIGS. 7-9, the door 16 has a planar base 50 with a dimension to overlie the second portion 40 of the opening in the base 24. A flange 52 extends upwardly from the plane of the base 50 and has a shape and dimension to complement the collar 30 of the mounting plate 14. The flange 52 has an arcuate shape complementing the arcuate shape of the collar 30 and a length to complete a circle as shown in FIGS. 3 and 14. The resulting circular flange formed by the collar 30 and the door 16 close the second portion 40 of the opening to capture and support the swivel connector 18.

The flange 52 has a height corresponding to the collar 30 and a length to fit within the open area 38 of the collar 30 between the ends 39. As shown in FIG. 14, the flange 52 fits within the open area 38 so that the side edges 54 of the flange 52 lie adjacent the inner edges 39 of the collar 30 defined by the open area 38 and form a continuous concave inner surface for mating with the swivel connector 18. The base 50 of the door 16 has a dimension greater than the second portion 40 of the opening and is attached to the outer face of the base 24 of the mounting plate 14.

As shown in FIG. 8, base 50 of door 16 has an aperture closely spaced to the side edge 58 for coupling with the hinge barrel 44. The aperture 56 is spaced from the side edge 58 to define a thin portion 60 with a dimension to be received within the axial passage 62 of hinge barrel 44 and function as a hinge pin. As shown, the portion 60 of the base is captured by the hinge barrel to couple the door 16 to the mounting plate and to allow the door to pivot downwardly away from the base 24 about an axis substantially parallel to the plane of base 24 and the ceiling. The orientation and location of the hinge barrel 44 and the pivot axis allow the electrical box to be recessed from the outer face of the ceiling without the ceiling interfering with the opening and closing of the door.

Figure 11:
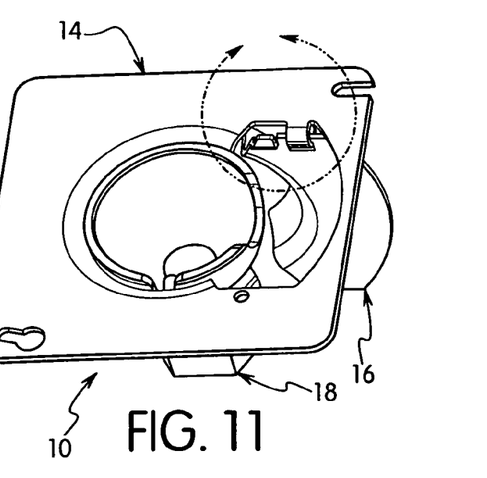
FIG. 11 is a top view of the mounting plate showing the hinge assembly of the door.
Figure 12:
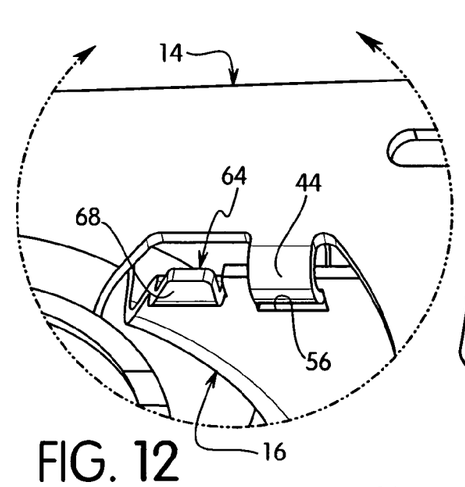
FIG. 12 is an enlarged view of the hinge assembly.
Figure 13:
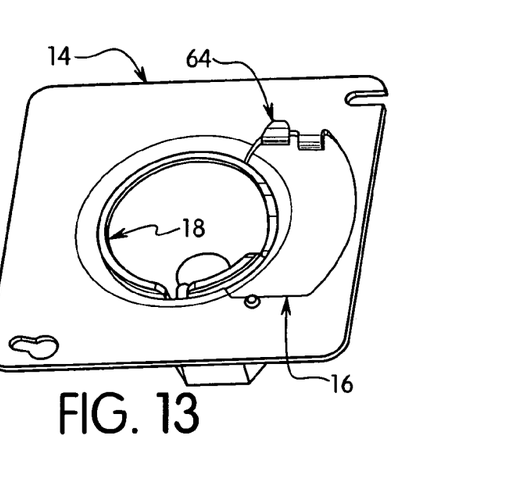
FIG. 13 is a top view showing the door in the closed position.

A coupling tab 64 is formed adjacent the aperture 56 for coupling with the base 24. As shown in FIG. 9, the coupling tab 64 has a first leg 66 that extends away from the base 50 opposite the flange 52 and an outwardly extending leg 68 extending parallel to the plane of the base 50. The first leg 66 has a length to space the second leg 68 from the plane of the base a distance corresponding substantially to the thickness of the base 24 of the mounting plate 14. As shown in FIGS. 11-13, the door 16 pivots to the closed position so that the second leg 68 passes through the opening 40 in the mounting plate 14 and engages the top face of the mounting plate 14 to prevent separation of the door 16 from the mounting plate when the door is in the closed position. The bottom face of base 50 of door 16 contacts the outer face of base 24 of mounting plate 14 to capture base 24 between leg 68 and base 50. Base 50 of door 16 includes a screw hole at an end opposite the aperture 56 for receiving a coupling screw 70 for mating with screw hole 48 in base 24 of mounting plate 14 and securing door 16 in the closed position as shown in FIG. 14.

Figure 1:
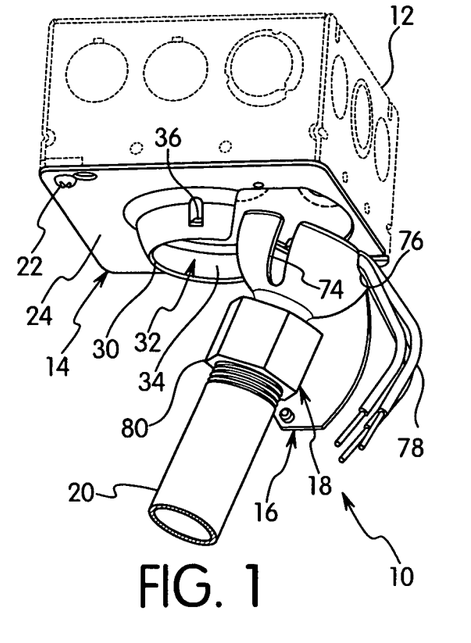
FIG. 1 is a perspective view of the swivel cover assembly showing the swivel hanger member being inserted into the opening in the mounting plate.
Figure 2:
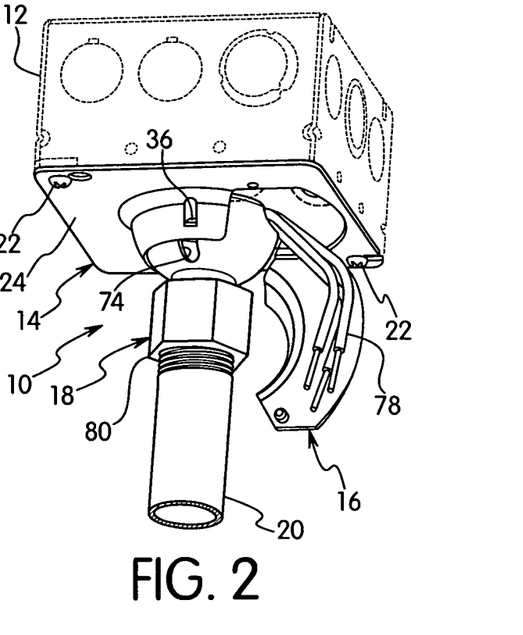
FIG. 2 is a perspective view of the swivel cover assembly showing the swivel hanger coupled to the mounting plate with the door in the open position.

Swivel hanger 18 as shown in FIGS. 1-3, has a semispherical shaped coupling member 72 for mating with the inner surface of the collar 30 of the mounting plate 14. The coupling member 72 has a shape and dimension corresponding to the shape and dimension of the collar 30 to allow limited pivotal movement between the swivel hanger 18 and the mounting plate 14. The coupling member 72 includes a longitudinal slot 74 for receiving the tab 36 to prevent rotation of the coupling member with respect to the collar 30. A U-shaped recess 76 is provided at a top edge of the coupling member 72 for receiving wires 78 extending from the electrical device through the coupling member 72 during installation of the coupling member to the mounting plate 14. In the embodiment shown, the swivel hanger 18 includes a threaded nut 80 coupled to the conduit 20 for supporting the electrical device.

In use, the assembly 10 is coupled to the electrical box as shown in FIGS. 1-3. The door 16 is opened to hang downwardly from the mounting plate by pivoting about an axis parallel to the plane of the mounting plate. Pivoting the plate downwardly avoids interference with the ceiling panel. The swivel hanger 18 is inserted through the opening in the base 24 and collar 30 and fitted into the socket defined by the collar as shown in FIG. 2 with the wires 78 extending through the recess 76 to be accessible. The wires of the electrical box (not shown) can pass through the opening 38. In this manner, the weight of the swivel connector and electrical device can be suspended by the collar 30 of the base 24 while the electrical connections can be made. The wires 78 are then connected to the electrical connections within the box 12 and the wires and connections are pushed through the opening 38 into the cavity of the box 12. Door 16 is pivoted to the closed position shown in FIG. 3 and secured by the screw 70.

Figures 15, 16:
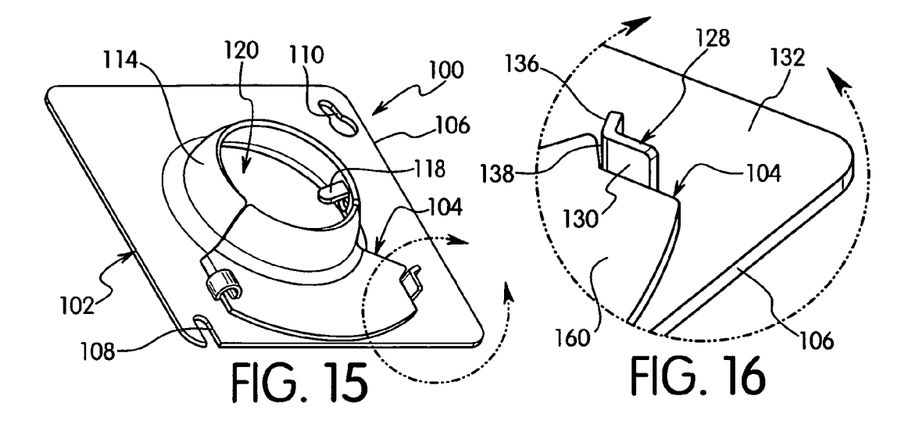
FIG. 15 is a perspective view of the swivel cover assembly in a second embodiment.
FIG. 16 is an enlarged view of the latch of the swivel cover assembly of FIG. 15.
Figure 22:
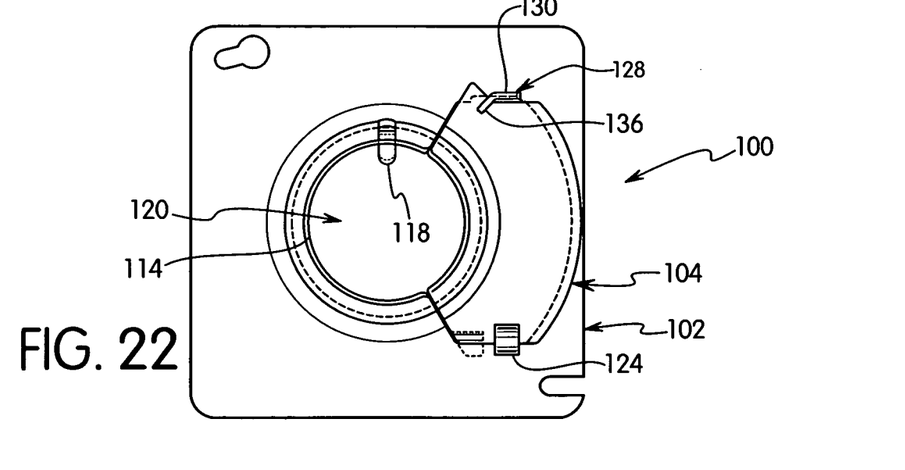
FIG. 22 is a top view of the swivel cover assembly showing the door in the latched position.
Figures 23, 24:
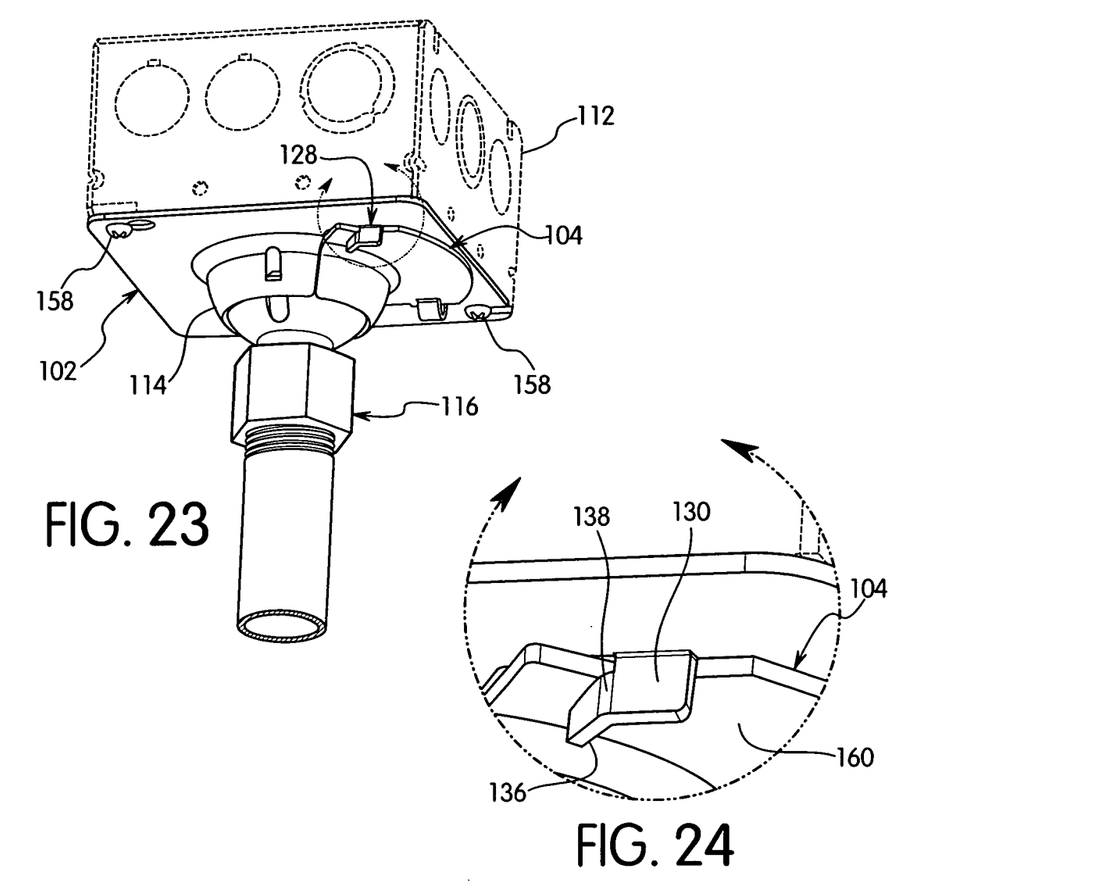
FIG. 23 is a perspective view showing the swivel hanger coupled to the mounting plate.
FIG. 24 is an enlarged view showing the latch member bent to the latching position.

FIGS. 15-24 show a second embodiment of the invention. In this embodiment, the assembly 100 includes a mounting plate 102 with a door 104. Mounting plate 102 is similar to the previous embodiment and includes a planar base 106 having a slot 108 and a keyhole-shaped opening 110 for mounting the mounting plate 102 to an electrical box 112 as shown in FIG. 23. Base 106 includes an outwardly extending collar 114 having a curved inner surface defining a socket for the swivel connector 116. An inwardly extending tab 118 is cut from the collar and bent inwardly as shown in FIG. 15 to engage a slot in the swivel connector as in the previous embodiment.

Figure 18:
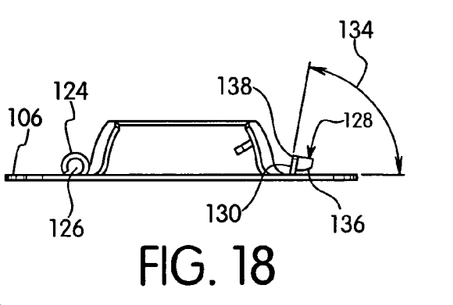
FIG. 18 is a side view of the mounting plate of FIG. 17.
Figures 19, 20:
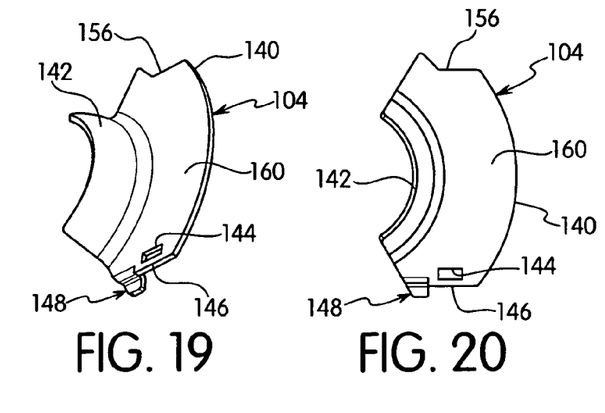
FIG. 19 is a perspective view of the door of the embodiment of FIG. 15.
FIG. 20 is a top view of the door of FIG. 19.
Figure 21:
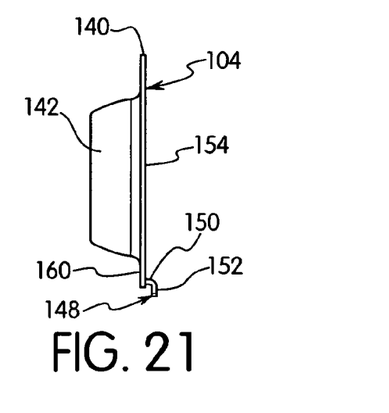
FIG. 21 is an end view of the door of FIG. 19.

Mounting plate 102 includes a central opening in the collar 114 as in the previous embodiment with a first semi-circular shape 120 defined by the collar 114, and a second portion 122 formed in the base 106. As in the previous embodiment, the opening 122 is formed within the base 106 so that the outer edge of the base surrounds the opening. A hinge barrel 124 is formed by a tab integral with the base 106 and bent into a cylindrical shape as shown in FIG. 18 to form an axial passage 126. As in the previous embodiment, the tab is bent away from the opening 122 so that the hinge barrel overlies the base 106.

Figure 17:
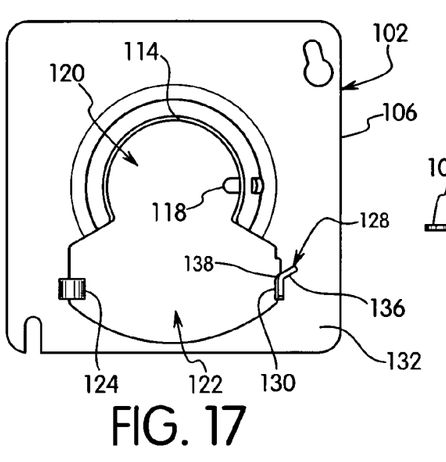
FIG. 17 is a top view of the mounting plate of the embodiment of FIG. 15.

At the opposite end of the second portion 122 of the opening, a bendable tab 128 is integral with the base 106 for capturing and securing the door 104 in the closed position. The bendable tab includes a first leg 130 that extends from the outer face 132 of the base 106. The first leg 130 is preferably formed at an inclined angle angled with respect to the base 106 and away from the opening 120 to avoid interference with the door 104 in the opening and closing of the door. In the embodiment shown, the first leg 130 is formed at an angle of about 80° as shown by arrow 34 with respect to the plane of the base 106. A second leg 36 extends from a side edge 138 at an outwardly extending angle with respect to the plane of the first leg 130 as shown in FIGS. 16 and 17.

Door 104 is similar to the door in the previous embodiment and includes a planar base 140 and an arcuate shaped flange 142 for mating with the collar 114 and defining a circular opening for receiving the swivel connector 116. A first edge of the base 140 is provided with a slot 114 spaced close to the edge to define a portion 146 to be received within the axial passage of the hinge barrel 124 for pivotally connecting the door 104 to the mounting plate 102. An L-shaped tab 148 is formed adjacent the slot 144 where the first leg 150 extends away from an inner face of the base and a second leg 150 extends outwardly forming an outwardly extending tab for mating with the inner face 154 of the base 106. A second opposite edge of the base 140 has a recessed notch 156 for cooperating with the bendable tab 136.

In use, the assembly 100 is attached to the electrical box 112 as shown in FIG. 23 by mounting screws 158. The swivel connector 116 is substantially the same as in the previous embodiment and is fitted within the opening of the mounting plate 102 and received in the socket defined by the collar 114 as in the previous embodiment and as shown in FIG. 23. The door 104 is pivoted upwardly to close the opening and complete the annular collar securing the swivel connector in place. The second leg 136 of the tab 128 is manually bent inwardly to engage the outer face 160 of base 140 as shown in FIGS. 22-24 for securing the door 104 in the closed position.

Figure 25:
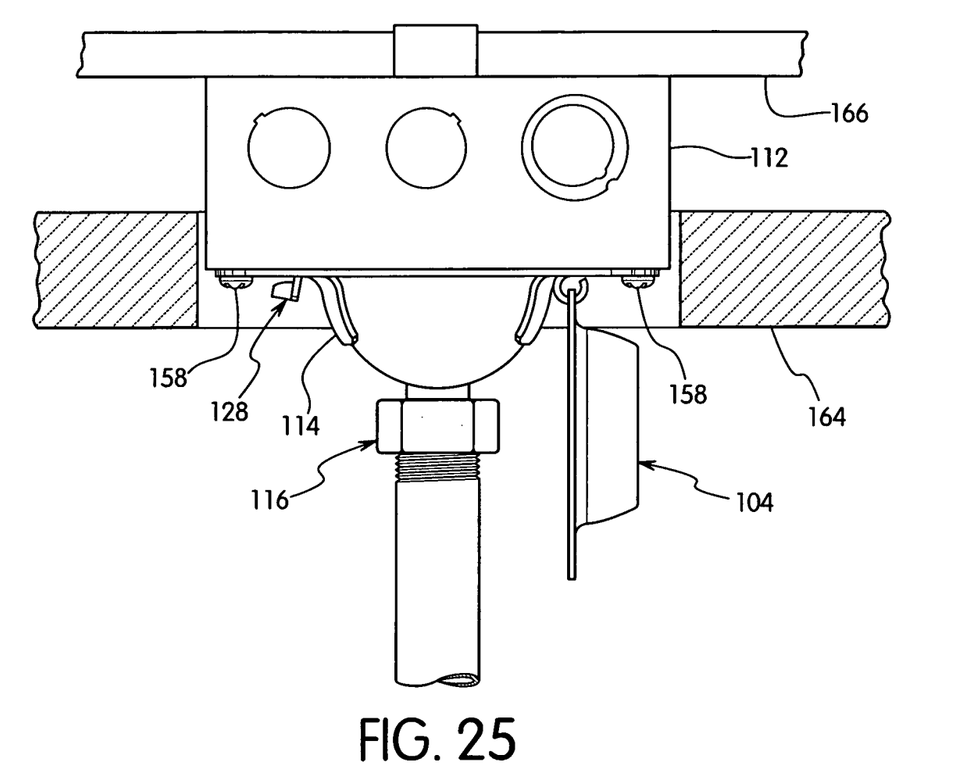
FIG. 25 is a side view of the assembly with the door in the open position.

The hinge barrel 124 allows the door 104 to pivot downwardly as shown in FIG. 25 about an axis parallel to the plane of the base 106 to allow the swivel connector 116 to be inserted into the socket defined by the collar 114. The electrical box 162 can be recessed from the outer face of the ceiling 164 and supported by a bracket or bar 166. The pivot axis of the hinge barrel 124 allows the door 104 to swing open by gravity without interference from the ceiling.

While various embodiments have been chosen to illustrate the invention, it will be understood by those skilled in the art that various changes and modifications can be made without departing from the scope of the invention as defined in the appended claims.

What is claimed is:

1. A swivel cover assembly comprising:
a mounting plate adapted for coupling to an electrical box, said mounting plate having a planar base with a top surface, a bottom surface and an opening, said opening having a first portion defined by a flange extending outwardly from said planar base and forming a socket adapted for supporting a swivel hanger, and a second portion with a dimension to receive the swivel hanger, said planar base having a first hinge member with a pivot axis substantially parallel to a plane of said planer base; and
a door having a first end with a second hinge member pivotally coupled to said first hinge member to pivot said door about an axis substantially parallel to the plane of said base, said first end of said door further including a coupling tab positioned to pivot through said opening in said base of said mounting plate by closing said door and move over said top surface of said base in a closed position, said door having a second end with a fastener for coupling with said base of said mounting plate and retaining said door in a closed position.

2. The swivel cover assembly of claim 1, wherein said door has a dimension greater than said second portion of said opening and where said door overlies an outer face of said mounting plate.

3. The swivel cover assembly of claim 1, wherein said coupling tab has a leg spaced from a planar base of said door a distance corresponding substantially to the thickness of said base of said mounting plate, and where said leg extends outwardly from an edge of said door substantially parallel to a plane of said planar base of said door, whereby said leg pivots away from said base in the open position and pivots over said base to engage the top surface of the base in the closed position.

4. The swivel cover assembly of claim 1, wherein said door and coupling tab pivot away from said base in the open position.

5. The swivel cover assembly of claim 1, wherein said first hinge member has a substantially cylindrical shape and is integrally formed with said base as a one piece unit, and where said second hinge member is received in an axial passage of said first hinge member.

6. The swivel cover assembly of claim 1, wherein said first hinge member is a cylindrical hinge barrel formed from a curled tab integral with said planar base and extending outwardly from a bottom surface of said planar base; and
said second hinge member is defined by an aperture in said door receiving said curled tab.

7. The swivel cover assembly of claim 6, wherein said fastener is a screw extending through said door and threaded into a screw hole in said base.

8. The swivel cover assembly of claim 1, wherein said base of said door includes a coupling tab next to said pivot member, said coupling tab having a leg spaced from a plane of said base of said door and extending away from said first end of said door in a plane substantially parallel to said base of said door for engaging a top face of said base of said mounting plate in the closed position.

9. The swivel cover assembly of claim 8, wherein said coupling tab has a first leg extending outward from the plane of said base and a second leg extending from said first leg substantially parallel to a plane of said base, said second leg pivoting away from said base in the open position and engaging the top face of the base in the closed position.

10. A swivel cover assembly, comprising:
a mounting plate adapted for being coupled to an electrical box, said mounting plate having a substantially planar base with a top surface, a bottom surface, and an opening with a first portion having a downwardly extending flange around said first portion of said opening to form a socket, and a second portion with a first hinge member;
a swivel hanger having an end adapted for mating with said socket and having a dimension to pass through said second portion of said opening; and
a door with a planar base having a first end hinged to said first hinge member of said planar base of said mounting plate by a second hinge member to pivot about an axis between an open position and a closed position, and a coupling member for coupling said mounting plate and said door in a closed position to close said first portion and second portion of said opening, said door further comprising a coupling tab integral with said door at said first end, said coupling tab extending outwardly from said first end and positioned to pass through said second portion of said opening in said base over said top surface of said base when said door is in the closed position and to move through said opening in said base away from said top surface of said base when said door is in the open position.

11. The swivel cover assembly of claim 10, wherein said second portion of said opening is formed in said base.

12. The swivel cover assembly of claim 10, wherein said first hinge member is a hinge barrel having an axial passage oriented parallel to a plane of said base and spaced outwardly from the bottom surface of said base, and
said second hinge member includes a pivot member extending through said axial passage.

13. The swivel cover assembly of claim 12, wherein said first hinge member is formed from a tab integral with said base and formed into a cylindrical shape.

14. The swivel cover assembly of claim 13, wherein said second hinge member has an aperture in said planar base of said door next to an outer edge, and where said pivot member is defined by a portion of said door between said aperture and said outer edge of said door.

15. The swivel cover assembly of claim 14, wherein said tab of said first hinge member is curled over the outer surface of said base away from said opening in said base and has a free end under said base.

16. The swivel cover assembly of claim 10, wherein said coupling tab has a first leg extending away from a top face of said door and a second leg extending from said first leg and being oriented substantially parallel to said base of said door.

17. The swivel cover assembly of claim 10, wherein said door is pivotally connected to said mounting plate to pivot between a closed position covering said opening and an open position hanging downwardly by gravity where a longitudinal plane of said door is substantially perpendicular to said mounting plate.

18. The swivel cover assembly of claim 10, wherein said coupling member is a fastener coupled to said door.

19. The swivel cover assembly of claim 10, wherein said coupling member is a tab on said mounting plate, said tab being bendable from a first open position to a second latched position under an edge of said door.

20. The swivel cover assembly of claim 19, wherein said tab has a first portion coupled to said base and a second portion coupled to said first portion at a fold line, said second portion being bendable about said fold line to said latched position.

21. A swivel assembly, comprising:

an electrical box having a downwardly facing open end;

a mounting plate coupled to said open end of said electrical box, said mounting plate having a planar base with a top surface mating with said electrical box and a bottom surface facing downwardly, and a downwardly extending flange defining a first portion of an opening and a socket, said opening in said mounting plate further having a second portion, said planar base of said mounting plate having a tab forming a substantially cylindrical hinge barrel with a center axis extending substantially parallel to a plane of said mounting plate, said hinge barrel being oriented on said bottom surface of said planar base and under said planar base;

a swivel hanger having an end for mating with said socket and having a dimension to pass through said second portion of said opening in said mounting plate; and a door having a first end with a hinge member coupled to said hinge barrel to pivot said door downwardly about an axis parallel to the plane of said base of said mounting plate; and a fastener for coupling to said mounting plate and retaining said door in a closed position, said fastener comprising a tab integrally formed with said mounting plate and extending away from the plane of said planar base, said tab being in a first open position to allow said door to pivot to a closed position and being bendable to a second position under a portion of said door to latch said door in a latched position.

22. The swivel cover assembly of claim 21, wherein said planar base extends outwardly from said flange, and where said second portion of said opening is formed in said planar base and spaced inwardly from an outer edge of said base, said hinge barrel being oriented on said bottom side of said base next to said opening.

23. The swivel cover assembly of claim 22, wherein said door has a planar base and a flange complementing said flange on said mounting plate, said base of said door having a dimension larger than said opening in said mounting plate, said base of said door having an aperture adjacent said first end and spaced from an outer edge a distance to define a pivot member between said aperture and said outer edge, said pivot member being received in said hinge barrel.

24. The swivel cover assembly of claim 23, wherein said hinge barrel has a center axis spaced outwardly from said opening, where said tab has a curled shape with an end overlying said base of said mounting plate.

25. The swivel assembly of claim 21, wherein said tab has a first portion integrally formed with said planar base and extending outwardly from a plane of said planar base, and a second portion coupled to said first portion and being bendable to a latched position over a portion of said door to latch said door in the closed position.

26. The swivel assembly of claim 25, wherein said second portion of said tab is coupled to said first portion by a fold line oriented in a plane extending away from said plane of said planar base.

27. The swivel assembly of claim 26, wherein said first portion of said tab is coupled to an edge of said second portion of said opening in said mounting plate, and where said second portion of said tab extends inwardly with respect to said second portion of said opening when said second portion is in said latched position.

\* \* \* \* \*